US006829017B2

(12) United States Patent
Phillips

(10) Patent No.: US 6,829,017 B2
(45) Date of Patent: Dec. 7, 2004

(54) SPECIFYING A POINT OF ORIGIN OF A SOUND FOR AUDIO EFFECTS USING DISPLAYED VISUAL INFORMATION FROM A MOTION PICTURE

(75) Inventor: Michael E. Phillips, Melrose, MA (US)

(73) Assignee: Avid Technology, Inc., Tewksbury, MA (US)

( * ) Notice: Subject to any disclaimer, the term of this patent is extended or adjusted under 35 U.S.C. 154(b) by 890 days.

(21) Appl. No.: 09/775,113

(22) Filed: Feb. 1, 2001

(65) Prior Publication Data

US 2002/0103553 A1 Aug. 1, 2002

(51) Int. Cl.[7] .................................................. H04N 5/60
(52) U.S. Cl. ....................................... 348/738; 348/578
(58) Field of Search ................................ 348/736, 738, 348/578, 579, 580, 581, 583, 462, 481, 483, 485; 386/54, 39, 96, 98, 99, 104–106; 381/26–28, 58, 61; 700/94; 352/12, 15; H04N 5/60, 9/74

(56) References Cited

U.S. PATENT DOCUMENTS

| | | | | |
|---|---|---|---|---|
| 5,212,733 A | | 5/1993 | DeVitt et al. | |
| 6,154,549 A | | 11/2000 | Arnold et al. | |
| 6,184,937 B1 | * | 2/2001 | Williams et al. | 348/578 |
| 6,611,297 B1 | * | 8/2003 | Akashi et al. | 348/739 |

OTHER PUBLICATIONS

Basu, S., et al., "Vision–Steered Audio for Interactive Environments", MIT Media Lab Perceptual Computing Section Technical Report No. 373, appears in Proc. of IMAGE'COM '96, Bordeaux, France, May 1996, pp. 1–6.

Mueller, W., et al., "A Scalable System for 3D Audio Ray Tracing", Proceedings ICMCS 1999, vol. 2, pp. 819–823.

Whittleton D., et al., "A Computer Environment For Surround Sound Programming", The Institution of Electrical Engineers, 1994, pp. 8/1–8/6.

* cited by examiner

*Primary Examiner*—Sherrie Hsia
(74) *Attorney, Agent, or Firm*—Peter J. Gordon

(57) ABSTRACT

Displaying visual information from a motion picture in a visual field within a designated extent of a related aural field supports editing of a spatial audio effect for the motion picture. The extent of a related aural field also is displayed. Information specifying a point of origin of a sound used in the spatial audio effect with respect to the visual field is received for each of a number of frames of a portion of the motion picture. This information may be received from a pointing device that indicates a point in the displayed extent of the aural field, or from a tracker that indicates a position of an object in the displayed visual information, or from a three-dimensional model of an object that indicates a position of an object in the displayed visual field. Using the specified point of origin and the relationship of the visual and aural fields, parameters of the spatial audio effect may be determined, from which a soundtrack may be generated. Information describing the specified point of origin may be stored. The frames for which points of origin are specified may be key frames that specify parameters of a function defining how the point of origin changes from frame to frame in the portion of the motion picture. The relationship between a visual field and an aural field may be different for each of the plurality of frames in the motion picture. This relationship may be specified by displaying the visual information from the motion picture and an indication of the extent of the aural field to a user, who in turn, through an input device, may indicate changes to the extent of the aural field with respect to the visual information.

33 Claims, 3 Drawing Sheets

SPECIFYING A POINT OF ORIGIN OF A SOUND FOR AUDIO EFFECTS USING DISPLAYED VISUAL INFORMATION FROM A MOTION PICTURE

BACKGROUND

A motion picture generally has a soundtrack, and a soundtrack often includes special effects that provide the sensation to an audience that a sound is emanating from a location in a theatre. Such special effects are called herein "spatial audio effects" and include one-dimensional effects (stereo effects, often called "panning"), two-dimensional effects and three-dimensional effects (often called "spatialization," or "surround sound"). Such effects may affect the amplitude, for example, of the sound in each speaker.

To create such spatial audio effects, the soundtrack is edited using a stereo or surround sound editing system or a digital audio workstation that has a graphical and/or mechanical user interface that allows an audio editor to specify parameters of the effect. For example, in the Avid Symphony editing system, a graphical "slider" is used to define the relative balance between left and right channels of stereo audio. For surround sound, an interface may be used to permit an editor to specify a point in three-dimensional space, from which the relative balance among four or five channels can be determined. Some systems allow the user simultaneously to hear the spatial audio effect and to see a representation of the effect parameters. Using such systems, the settings for various spatial audio effects are set subjectively by the audio editor based on the audio editor's understanding of how the point of emanation of the sound is related to images in the motion picture.

SUMMARY

Displaying visual information from a motion picture in a visual field within a designated extent of a related aural field supports editing of a spatial audio effect for the motion picture. The extent of a related aural field also is displayed. Information specifying a point of origin of a sound used in the spatial audio effect with respect to the visual field is received for each of a number of frames of a portion of the motion picture. This information may be received from a pointing device that indicates a point in the displayed extent of the aural field, or from a tracker that indicates a position of an object in the displayed visual information, or from a three-dimensional model of an object that indicates a position of an object in the displayed visual field. Using the specified point of origin and the relationship of the visual and aural fields, parameters of the spatial audio effect may be determined, from which a soundtrack may be generated. Information describing the specified point of origin may be stored. The frames for which points of origin are specified may be key frames that specify parameters of a function defining how the point of origin changes from frame to frame in the portion of the motion picture. The relationship between a visual field and an aural field may be different for each of the plurality of frames in the motion picture. This relationship may be specified by displaying the visual information from the motion picture and an indication of the extent of the aural field to a user, who in turn, through an input device, may indicate changes to the extent of the aural field with respect to the visual information.

DETAILED DESCRIPTION

Displaying visual information from a motion picture in a visual field within a designated extent of a related aural field supports editing of a spatial audio effect for the motion picture. The visual field represents the field of view of the visual stimuli of the motion picture from the perspective of the audience. The aural field represents the range of possible positions from which a sound may appear to emanate. The portions of the aural field that are also in the video field are "onscreen." The portions of the aural field that are not in the video field are "offscreen." The relationship between a visual field and an aural field may be different for each of the plurality of frames in the motion picture.

Figure 1A:
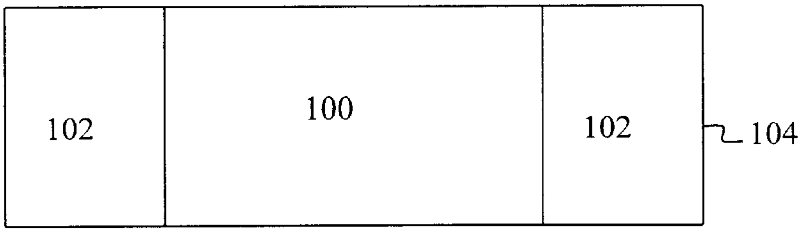
FIGS. 1A-C illustrate example relationships between visual and aural fields.
Figure 1B:
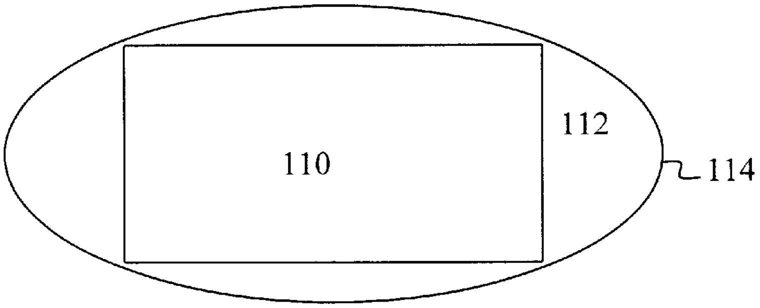
Figure 1C:
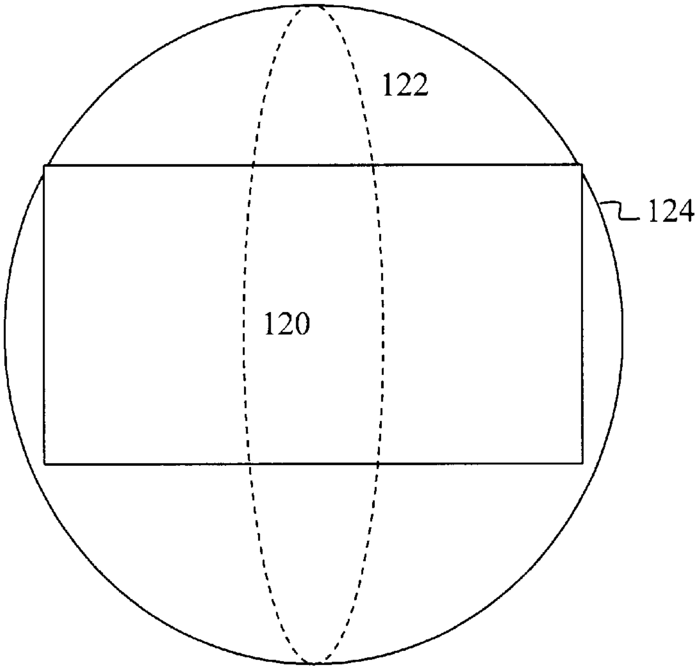

FIGS. 1A-C illustrate example relationships between visual and aural fields. In FIG. 1A, the visual field 100 is included within an aural field 102. Both the visual field and the aural field are two-dimensional and rectangular. Within the visual field 100, visual information from the motion picture may be displayed. An indication of the extent of the aural field 102 also may be displayed, for example, by a box 104. The aural field extends beyond the visual field on the left and right. The portion of the aural field extending beyond the visual field permits sound effect parameters, for example, left and right pan settings, to be defined for a sound that is offscreen.

In FIG. 1B, the visual field 110 is included within an aural field 112. Both the visual field and the aural field are two-dimensional. The visual field is rectangular whereas the aural field is an ellipse. Within the visual field 110, visual information from the motion picture may be displayed. An indication of the extent of the aural field 112 also may be displayed, for example, by an ellipse 114. The aural field extends beyond the visual field on the left, right, top and bottom.

In FIG. 1C, the visual field 120 is included within an aural field 122. The visual field is two-dimensional and rectangular and the aural field is three-dimensional, for example, a sphere. Within the visual field 120, visual information from the motion picture may be displayed. An indication of the extent of the aural field 122 also may be displayed, for example, by graphically depicting a sphere 124. The aural surrounds the visual field.

In FIGS. 1A-C, the visual field is shown within the aural field and has points at the edges of the aural field. The visual field may extend beyond portions of the aural field, or may not have any point on the edge of the aural field. The visual field also may be off center in the aural field. The visual field also may be three-dimensional, for example, where the visual information from the motion picture is generated using three-dimensional animation or where the visual information is intended to be displayed on a curved surface.

The aural field may be specified by default values indicating the size and shape of the aural field with respect to the visual field. The user may in turn, through an input device, indicate changes to the extent of the aural field with respect to the visual information. The default values and any changes specify a coordinate system within which a user may select a point, in a manner described below. For example, the range of available positions within an aural field may be specified as −100 to 100 in a single dimension (left to right or horizontally with respect to the visual field), with 0 set as the origin or center. The specified position may be in one, two or three dimensions. The specified position may vary over time, for example, frame-by-frame in the motion picture.

Figure 2:
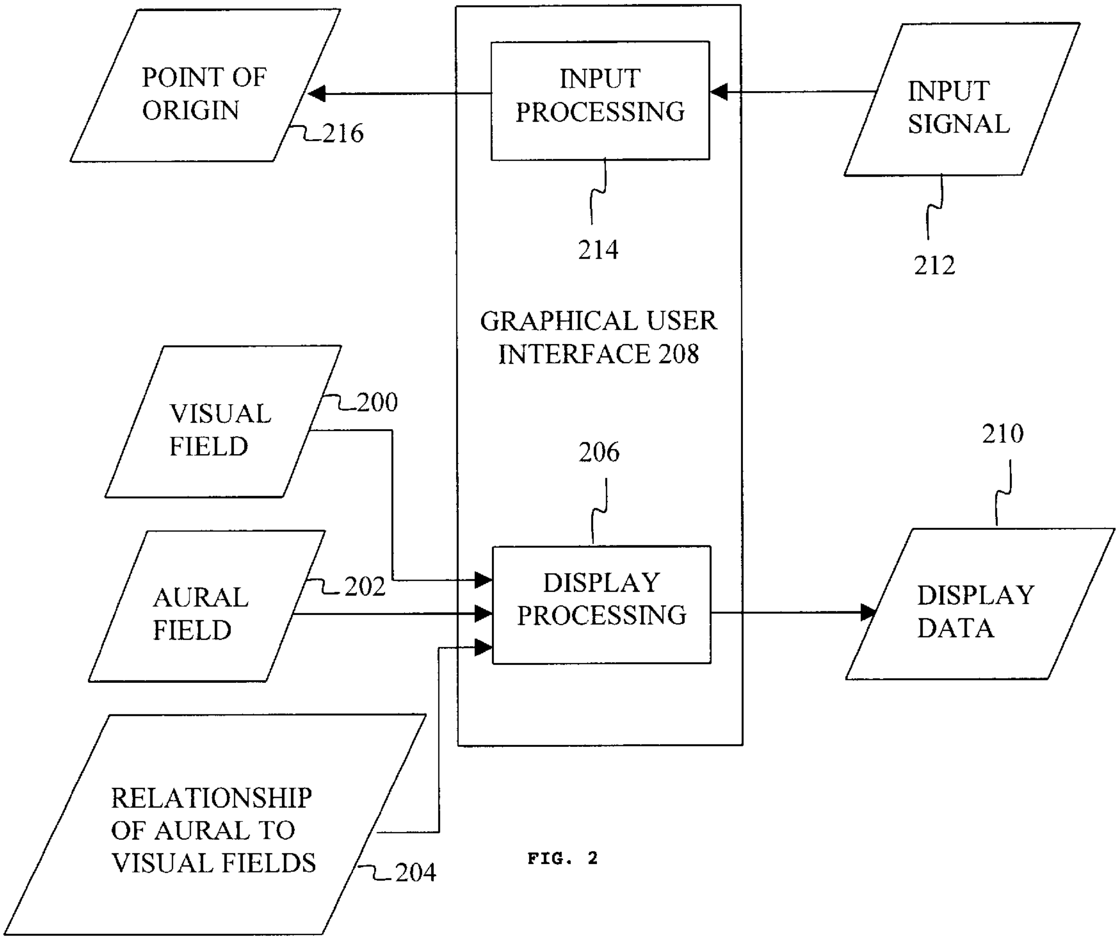
FIG. 2 is a dataflow diagram of operation of a graphical user interface.

A data flow diagram of a graphical user interface for a system using such information about the visual and aural fields is described in connection with FIG. 2.

Information describing the visual field 200, the aural field 202 and the relationship 204 of the aural and visual fields is received by a display processing module 206 of the graphical user interface 208. The information describing the visual field may include, for example, its size, position, shape and orientation on the display screen, and a position in a motion picture that is currently being viewed. The information describing the aural field may include, for example, its size, position, shape and orientation. The information describing the relationship 204 of the aural and visual fields may include any information that indicates how the aural field should be displayed relative to the visual field. For example, one or more positions and/or one or more dimensions of the aural field may be correlated to one or more positions and/or one or more dimensions in the video field. The size of the visual field in one or more dimensions may be represented by a percentage of the aural field in one or more dimensions. Also, given an origin of the aural field and a radius, one or more edges of the visual field may be defined by an angle.

This information 200, 202 and 204 is transformed by into display data 210 for example, to illustrate the relative positions of these fields, which is then provided to a display (not shown) for viewing by the editor. The display processing module also may receive visual information from the motion picture for a specified frame in the motion picture to create the display, or the information regarding the aural field may be overlaid on an already existing display of the motion picture. The user generally also has previously selected a current point in the motion picture for which visual information is being displayed.

The editor then manipulates an input device (not shown) which provides input signals 212 to an input processing module 214 of the graphical user interface 208. For example, a user may select a point in the visual field corresponding to an object that represents the source of a sound, such as a person. The input processing module converts the input signals into information specifying a point of origin 216. This selected point may be represented by a value within the range of −100 to 100 in the aural field. This point of origin is associated with the position in the motion picture that is currently being viewed. This information may be stored as "metadata", along with the information describing the aural field and its relationship to the visual field, for subsequent processing of the soundtrack, such as described below in connection with FIG. 3. During use of the system by the editor, the system may generate the sound effect to allow playback of the sound effect for the editor.

The information specifying the point of origin may be provided for each of a number of frames of a portion of the motion picture. Such frames may be designated as key frames that specify parameters of a function defining how the point of origin changes from frame to frame in the portion of the motion picture. The position of the sound for any intermediate frames may be obtained, for example, by interpolation using the positions at the key frames.

Information specifying a point of origin of a sound used in the spatial audio effect with respect to the visual field also may be received from a tracker that indicates a position of an object in the displayed visual information, or from a three-dimensional model of an object that indicates a position of an object in the displayed visual field.

Using the specified point of origin of a sound in the aural field, parameters of the spatial audio effect may be determined. In particular, the selected point in the aural field is mapped to a value for one or more parameters of a sound effect, given an appropriate formula defining the sound effect, for which many are available in the art. The sound effect may be played back during editing, or may be generated during the process of generating the final soundtrack.

Figure 3:
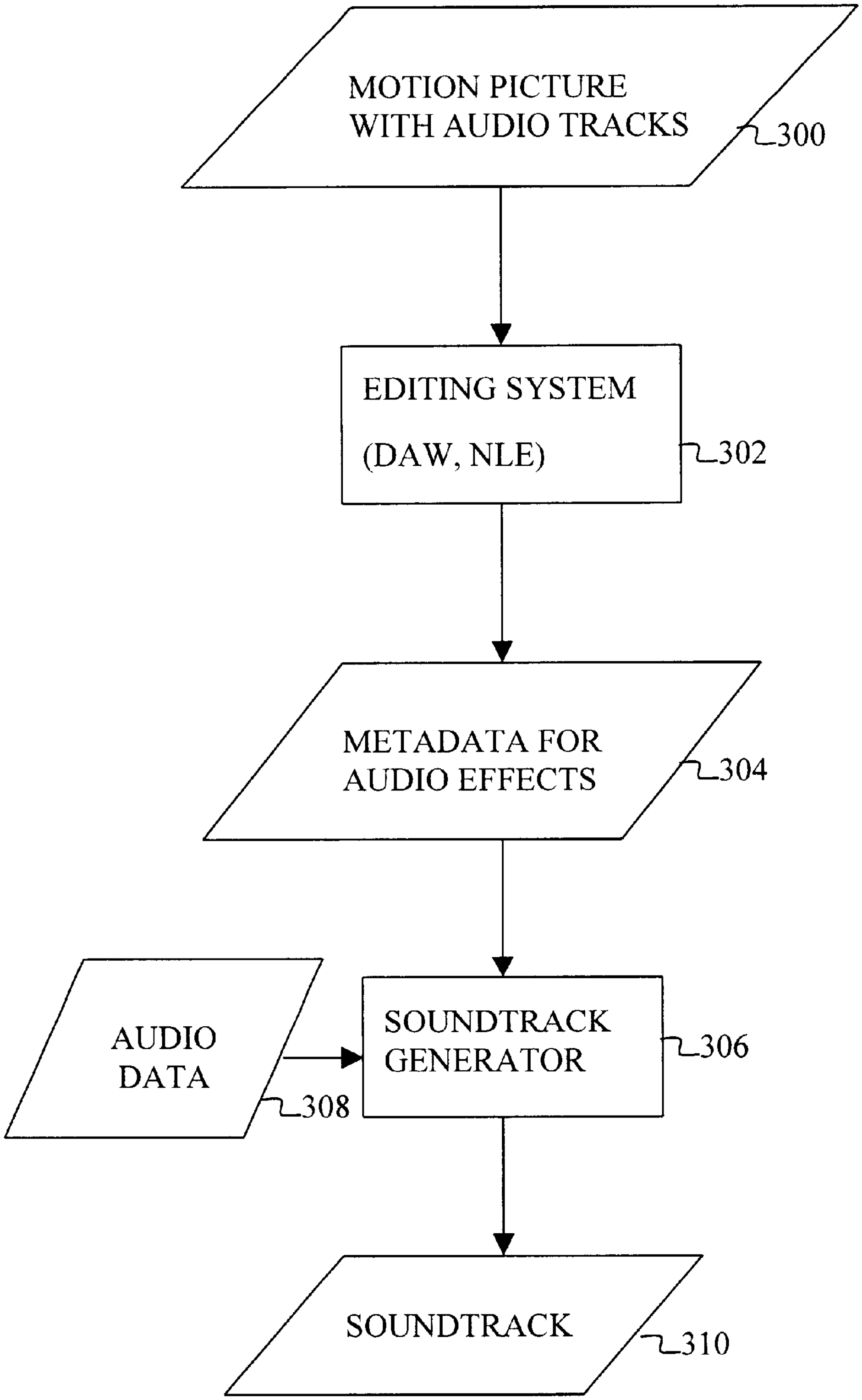
FIG. 3 is a dataflow diagram of a system for generating a soundtrack.

A typical process flow for creating the final soundtrack of the motion picture is described in connection with FIG. 3. A motion picture with audio tracks 300 is processed by an editing system 302, such as a digital audio workstation or a digital nonlinear editing system, that has an interface such as described above. The editing system 302 outputs metadata describing the audio effects 304. A soundtrack generator 306 receives the metadata output from the editing system 302, and the audio data 308 for the audio track, and produces the soundtrack 310 by determining the parameters of any audio effects from the metadata, and applying the audio effects to the audio data.

The use of visual and aural fields as described above may be used, for example, in a nonlinear editing system. Such a system allows an editor to combine sequences of segments of video, audio and other data stored on a random access computer readable medium into a temporal presentation, such as a motion picture. During editing, a user specifies segments of video and segments of associated audio. Thus, a user may specify parameters for sound effects during editing of an audio-visual program.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A process for defining a spatial audio effect for a motion picture, comprising:

receiving information defining a relationship between a visual field and an aural field;

displaying visual information from the motion picture in the visual field and an indication of an extent of the aural field according to the relationship between the visual field and the aural field; and receiving information specifying a point of origin of a sound used in the spatial audio effect with respect to the visual field for each of a number of frames of a portion of the motion picture.

2. The process of claim 1, further comprising: determining parameters for the spatial audio effect according to the specified point of origin.

3. The process of claim 1, further comprising:

storing information describing the specified points of origin for the number of frames.

4. The process of claim 3, wherein the information stored comprises:

an indication of the visual field;

an indication of the audio field;

an indication of the relationship between the audio field and the video field; and parameters specifying the points of origin for the number of frames according to the relationship between the audio field and the video field.

5. The process of claim 1, wherein the number of frames are key frames specifying parameters of a function defining how the point of origin changes from frame to frame in the portion of the motion picture.

6. The process of claim 1, wherein the spatial audio effect is a one-dimensional effect.

7. The process of claim 6, wherein the spatial audio effect is panning.

8. The process of claim 1, wherein the spatial audio effect is a two-dimensional effect.

9. The process of claim 1, wherein the spatial audio effect is a three-dimensional effect.

10. The process of claim 9, wherein the spatial audio effect is a spatialization effect.

11. The process of claim 9, wherein the spatial audio effect is a surround sound effect.

12. The process of claim 1, wherein the visual field is defined by a shape and size of an image from a sequence of still images.

13. The process of claim 1, wherein the visual field is defined by a shape and size of a rendered image of a three-dimensional model.

14. The process of claim 1, wherein the aural field is rectangular.

15. The process of claim 1, wherein the aural field is elliptical.

16. The process of claim 1, wherein the aural field is a polygon.

17. The process of claim 1, wherein the aural field is a circle.

18. The process of claim 1, wherein the aural field is larger than the image.

19. The process of claim 1, wherein the displayed visual information from the motion picture comprises an image from a sequence of still images.

20. The process of claim 1, wherein the displayed visual information from the motion picture comprises a rendered image of a three-dimensional model.

21. The process of claim 1, wherein receiving information specifying a point of origin comprises: receiving information from a pointing device that indicates a point in the displayed extent of the aural field.

22. The process of claim 1, wherein receiving information specifying a point of origin comprises:

receiving information from a tracker that indicates a position of an object in the displayed visual information.

23. The process of claim 1, wherein receiving information specifying a point of origin comprises:

receiving information from a three-dimensional model of an object that indicates a position of an object in the displayed visual field.

24. The process of claim 1, wherein receiving information defining a relationship between a visual field and an aural field includes receiving such information for each of a plurality of frames of the motion picture, and wherein such information may be different for each of the plurality of frames.

25. The process of claim 1, wherein receiving information defining the relationship between the visual field and the aural field comprises:

displaying the visual information from the motion picture;

displaying an indication of the extent of the aural field; and receiving input from an input device indicative of changes to the extent of the aural field with respect to the visual information.

26. A graphical user interface for allowing an editor to define a spatial audio effect for a motion picture, comprising:

means for displaying visual information from the motion picture in a visual field and for displaying an indication of an extent of an aural field according to a relationship between the visual field and the aural field; and means for receiving information specifying a point of origin of a sound used in the spatial audio effect with respect to the visual field for each of a number of frames of a portion of the motion picture.

27. A graphical user interface for allowing an editor to define a spatial audio effect for a motion picture, comprising:

an display output processing section having an input for receiving visual information from the motion picture, and data describing a visual field and an aural field and a relationship between the visual field an the aural field and an output for providing display data for display, including an indication of an extent of an aural field according to a relationship between the visual field and the aural field; and an input device processing section having an input for receiving information from an input device specifying a position of the input device, and an output for providing a point of origin of a sound used in the spatial audio effect with respect to the visual field for each of a number of frames of a portion of the motion picture.

28. A computer program product, comprising:

a computer readable medium;

computer program instructions stored on the computer readable medium that, when executed by a computer instruct the computer to perform a process for defining a spatial audio effect for a motion picture, comprising:

receiving information defining a relationship between a visual field and an aural field;

displaying visual information from the motion picture in the visual field and an indication of an extent of the aural field according to the relationship between the visual field and the aural field; and receiving information specifying a point of origin of a sound used in the spatial audio effect with respect to the visual field for each of a number of frames of a portion of the motion picture.

29. A digital information product, comprising:

a computer readable medium;

information stored on the computer readable medium that, when interpreted by a computer, indicates metadata defining a spatial audio effect for a motion picture, comprising:

an indication of a visual field associated with the motion picture;

an indication of an audio field;

an indication of a relationship between the audio field and the video field; and parameters specifying the points of origin of a sound used in the spatial audio effect for each of a number of frames of a portion of the motion picture.

30. A process for creating a soundtrack with at least one spatial audio effect for a motion picture, comprising:

performing editing operations on one or more audio tracks of an edited motion picture to add a spatial audio effect, including specifying a point of origin of a sound used in the spatial audio effect with respect to the visual field for each of a number of frames of a portion of the motion picture;

generating metadata specifying the point of origin of a sound used in the spatial audio effect with respect to the visual field for each of a number of frames of a portion of the motion picture; and generating the soundtrack using the generated metadata and sound sources.

31. A system for creating a soundtrack with at least one spatial audio effect for a motion picture, comprising:

means for performing editing operations on one or more audio tracks of an edited motion picture to add a spatial audio effect, including specifying a point of origin of a sound used in the spatial audio effect with respect to the visual field for each of a number of frames of a portion of the motion picture;

means for generating metadata specifying the point of origin of a sound used in the spatial audio effect with respect to the visual field for each of a number of frames of a portion of the motion picture; and means for generating the soundtrack using the generated metadata and sound sources.

32. A computer program product, comprising:

a computer readable medium;

computer program instructions stored on the computer readable medium that, when executed by a computer instruct the computer to perform a process for creating a soundtrack with at least one spatial audio effect for a motion picture, comprising:

performing editing operations on one or more audio tracks of an edited motion picture to add a spatial audio effect, including specifying a point of origin of a sound used in the spatial audio effect with respect to the visual field for each of a number of frames of a portion of the motion picture;

generating metadata specifying the point of origin of a sound used in the spatial audio effect with respect to the visual field for each of a number of frames of a portion of the motion picture; and generating the soundtrack using the generated metadata and sound sources.

33. A system for creating a soundtrack with at least one spatial audio effect for a motion picture, comprising:

a user interface module having an input for receiving editing instructions for performing editing operations on at least one audio track of an edited motion picture to add a spatial audio effect, the editing instructions including specifying a point of origin of a sound used in the spatial audio effect with respect to the visual field for each of a number of frames of a portion of the motion picture;

a metadata output module having an input for receiving the editing instructions and an output for providing metadata specifying the point of origin of a sound used in the spatial audio effect with respect to the visual field for each of a number of frames of a portion of the motion picture; and a soundtrack generation module having an input for receiving the metadata and an input for receiving sound sources and an output for providing the soundtrack using the generated metadata and sound sources.

* * * * *